(12) United States Patent
Huber

(10) Patent No.: US 6,847,831 B2
(45) Date of Patent: Jan. 25, 2005

(54) ADAPTABLE CHIP CARD

(75) Inventor: Adriano Huber, Locarno (CH)

(73) Assignee: Swisscom Mobile AG, Bern (CH)

( * ) Notice: Subject to any disclaimer, the term of this patent is extended or adjusted under 35 U.S.C. 154(b) by 0 days.

(21) Appl. No.: 10/150,334

(22) Filed: May 16, 2002

(65) Prior Publication Data

US 2002/0198022 A1 Dec. 26, 2002

Related U.S. Application Data

(63) Continuation of application No. PCT/CH99/00553, filed on Nov. 19, 1999.

(51) Int. Cl.[7] ............................. H04B 1/38; H04B 1/18; H04M 1/00
(52) U.S. Cl. ..................... 455/558; 455/551; 455/186.1
(58) Field of Search ................................ 455/557, 558, 455/550.1, 551, 466, 403, 418, 185.1, 186.1; 235/375, 380; 709/328, 310, 201; 370/389

(56) References Cited

U.S. PATENT DOCUMENTS

| | | | | |
|---|---|---|---|---|
| 6,131,040 A | * | 10/2000 | Knuutila et al. | 455/550.1 |
| 6,216,014 B1 | * | 4/2001 | Proust et al. | 455/558 |
| 6,418,326 B1 | * | 7/2002 | Heinonen et al. | 455/558 |
| 6,501,962 B1 | * | 12/2002 | Green | 455/558 |
| 2002/0040936 A1 | * | 4/2002 | Wentker et al. | 235/492 |
| 2002/0066792 A1 | * | 6/2002 | Guthery et al. | 235/492 |
| 2002/0091933 A1 | * | 7/2002 | Quick et al. | 713/182 |
| 2002/0111987 A1 | * | 8/2002 | De Jong | 709/201 |
| 2003/0039263 A1 | * | 2/2003 | Haislett | 370/422 |

FOREIGN PATENT DOCUMENTS

WO     WO 98 19237 A     5/1998

OTHER PUBLICATIONS

Connolly, E., "Automating The Home—And Paying For It", Computer Design, US, Pennwell Publishing, Littleton, Massachusetts, Bd. 26, Nr. 13, Jul. 1987.

* cited by examiner

Primary Examiner—Nay Maung
Assistant Examiner—Edan Orgad
(74) Attorney, Agent, or Firm—Pearne & Gordon LLP

(57) ABSTRACT

A chip card for communicating with an external device over a logical interface. The chip card has a test module capable of forwarding standardized data units to a standardized data unit handler and also capable of forwarding said standardized data units to other components of the chip card, such as an updated standardized data unit handler, thus allowing the chip card to utilize industry standards adopted after its manufacture.

29 Claims, 3 Drawing Sheets

ADAPTABLE CHIP CARD

The present application is a continuation of application PCT/CH99/00553 filed on Nov. 19, 1999 of which the content is included by reference.

FIELD OF THE INVENTION

The present invention concerns a chip card, in particular a chip card that can be adapted after its manufacture and distribution.

RELATED ART

Chip cards communicate with external devices, for example with a mobile telephone, over a logical interface often called API (Application Protocol Interface). The external device wanting to access a functionality of the chip card sends an order over this API interface. The card that receives an order from the external device can decode it and trigger the corresponding action.

Such orders are usually encoded as structured data units, called APDU (Application Packet Data Unit). An APDU consists usually of a header and a body, the header indicating the instruction to be performed and the instruction parameters whilst the body, which is not always present, contains data. This protocol is described among others in the ISO norm ISO/IEC 7816, part 4. Further orders are specified in system specific documents (e.g. GSM 11.11, GSM 11.14).

The definition of the API interface and the standardization of the APDU so as to be recognized by chip cards are developed mainly in standardization forums or are proposed by individual firms. For reasons of compatibility between chip cards and devices of different manufacturers, a strong international standardization of the API interface is a desirable aim.

The standardization of APDU orders is however a process that often happens more slowly than the technical development of the chip cards. For this reason, conventional chip cards cannot fulfill all the wishes of the users and in particular not all the wishes of the services providers or of the telecommunication network operators. Functionalities of a chip card that can technically already be realized and are even sometimes implemented in the card can often be offered only after the next standardization of the APDU specification.

WO9819237 (Schlumberger) describes a chip card with a virtual Java machine in which different applications are stored in an EEPROM. Applications can thus be modified or replaced. The instruction handler is however stored in the ROM, so that no new instructions can be added to the existing set of instructions.

It is therefore an aim of this invention to propose a method with which an external device can access the functionalities of a card for which the APDU has been standardized only after the manufacture of the chip card.

BRIEF SUMMARY OF THE INVENTION

According to the present invention, these aims are achieved in particular through the characteristics of the independent claims. Further advantageous embodiments are moreover described in the dependent claims and in the description.

In particular, these aims are achieved in that the functionality made available through the chip card when a data unit is received over the API interface is decoded, interpreted and performed by the application logic in the EEPROM part of the chip card.

In this way, the so-called APDU handler in the chip card and which determines the reaction to incoming data units can be modified, for example completed, renewed or replaced, at any moment in order to take into account newly defined, proprietary or non standardized APDU.

DESCRIPTION OF THE DRAWINGS

Hereafter, preferred embodiments of the invention will be described in more detail with the aid of the attached figures, in which.

DETAILED DESCRIPTION OF THE INVENTION

The following description refers to the special case of a chip card that is used as an identification module in a digital cellular mobile telephone, for example a SIM (Subscriber Identification Module) card or a WIM (Wireless Application protocol Identification Module) card, or WIM/SM (SIM with WIM application) that can be used for example in a GSM (Global System for Mobile Telecommunication), WAP (Wireless Application Protocol) or UMTS mobile telephone. The one skilled in the art will however understand that the present invention can also be applied to other types of chip cards, for example with JAVA (trademark of SUN Microsystems) or with OpenCard cards.

Figure 1:
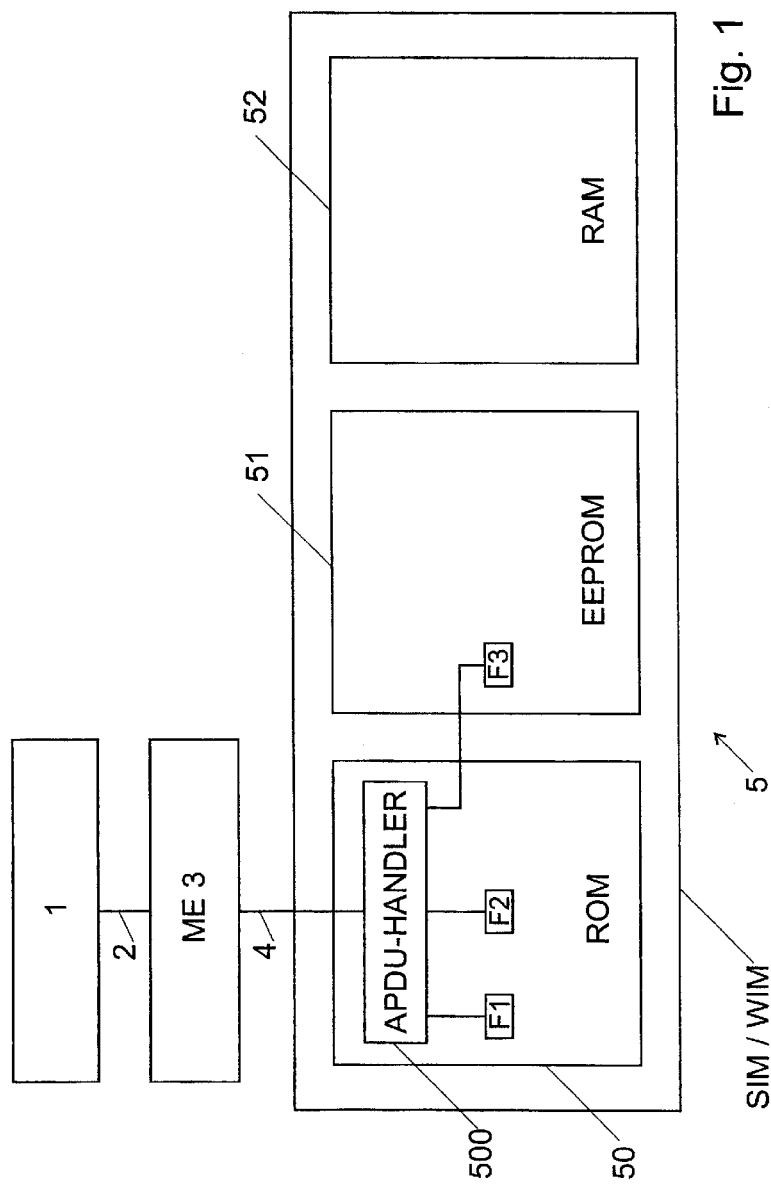
FIG. 1 shows a diagrammatic view of a system with a conventional chip card.

FIG. 1 shows diagrammatically an example of a known conventional system. The system comprises a terminal 3 (Mobile Equipment ME) and a conventional SIM or WIM card 5. An application 1, for example a browser or an application program, for example a program from a service provider, is executed by data processing means (not represented) in the mobile equipment 3. The application communicates with the mobile equipment 3 over an API (Application Protocol Interface) 2 that is here not detailed.

The mobile equipment 3 communicates with the SIM card 5 over another API interface 4. The mobile equipment 3 usually takes over the role of master of the communication over this interface whilst the SIM card 5 answers as slave. Protocol variants are however also known (for example according to SIM-Toolkit, i.e. GSM 11.14) in which the SIM card takes over, at least temporarily, the role of master.

A step in the API protocol consists in an order being sent to the chip card 5, in the card executing the order and if necessary in a reply being sent to the mobile equipment 3. Thus either orders or replies are exchanged over the interface 4. Data can be contained both in the orders and/or in the replies.

These questions and orders are encoded with standardized APDU (Application Protocol Data Unit). Some standardized APDU for ISO chip cards are described in the norm ISO/IEC 7816-4:1995(E). Additional APDU have been defined for SIM cards and for WIM cards in order to expand the functionalities of the API interface 4.

Figure 2:
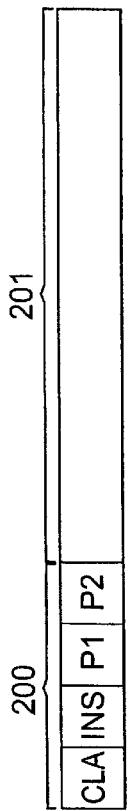
FIG. 2 shows a diagrammatic view of an APDU order according to the invention.

FIG. 2 shows the typical structure of an APDU 20. The data unit comprises a compulsory header 200 with four bytes and an optional body 201 of variable length.

The header contains a first byte (CLA) used to indicate among others which API version the data unit complies with.

A second byte (INS) gives the instruction that is to be executed or has just been executed by the chip card 5. Depending on the instructions, two further parameters P1 and P2 can be indicated. If an instruction does not require a parameter P1 and/or P2, this parameter must be set to zero.

The optional body 201 contains dada and at least one byte indicating the length of these data and/or the maximal length of the expected reply.

The conventional chip card 5 comprises generally a ROM 50, an EEPROM 51 and a RAM 52, as well as data processing means (not represented). The ROM nowadays typically has 64 Kbytes and usually includes the operating system, a Java virtual machine (JVM, trademark of SUN Microsystems) and different components F1, F2, . . . , for example JavaBeans, Applets or programs for making available the card's different functionalities. Components are also stored in the EEPROM 51, for example components that have been downloaded as applet after the personalization of the card as well as personal user data, for example a telephone directory, an electronic certificate, etc. The EEPROM can for example comprise 16 or 32 Kbytes. Temporary data are stored in the RAM 52, for example temporary variables. Applications (applets) can furthermore be stored in the EEPROM.

A data unit handler 500, often called APDU handler, receives the APDU of the mobile equipment 3 received over the API interface 4 and analyses the header 200, in particular the bytes CLA and INS, in order to forward the order to the appropriate component F1, F2, . . . that can execute the order. The APDU handler 500 can then receive the reply of this component and send this reply over the API interface 4 to the mobile equipment 3.

The APDU handler 500 is usually implemented in the ROM part 50. The program is executed by the data processing means when an incoming APDU is detected. It is however also possible to devise the APDU handler as a circuit. A problem with this configuration is that the mobile equipment 3 and the application cannot access new functionalities of the card made available through new components G1, G2, G3 in the ROM, EEPROM or RAM, as long as no APDU 20 has been standardized for this functionality. Even when such an APDU has been defined and standardized, chip cards 5 that have already been distributed cannot offer this functionality if they only have a conventional APDU handler 500 unable to recognize this APDU that has been defined later, even if the required component G1, G2, . . . is contained in the card. For these reasons, new functionalities that would be possible through the continuous and fast development of chip cards can be distributed only slowly.

Figure 3:
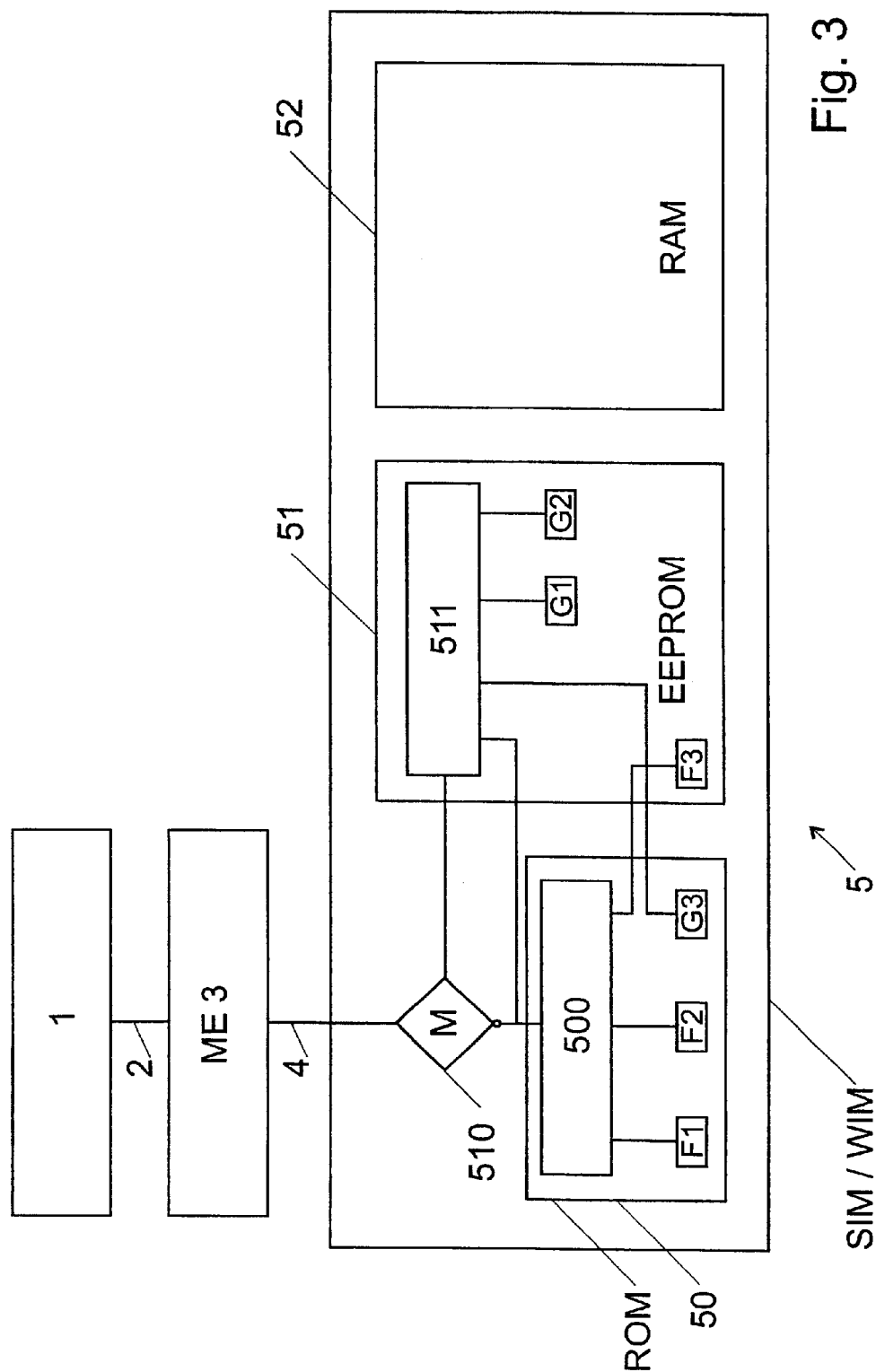
FIG. 3 shows a diagrammatic view of a system with a chip card according to a first embodiment of the invention.

FIG. 3 shows an example of a first embodiment of a chip card 5 according to the invention, for example a SIM or WIM card that can solve these problems. In this embodiment, the chip card has a test module 510 that checks all APDU 20 received over the API interface 4. If the test module detects that the received APDU was already provided at the time the ROM part 50 was manufactured, it forward this APDU to a conventional APDU handler 500 in the ROM part 50 that makes available the corresponding functionality F1, F2, . . . as described above. If, on the other hand, the test module detects that the received APDU 20 was not provided at the time the ROM part 50 was manufactured, for example because it was standardized only in a later version of the API interface 4, it forwards this APDU to a new, modified APDU handler 511 that calls up the component G1, G2, G3, . . . provided for this new APDU in the ROM or EEPROM.

The test as to whether the received APDU should be sent to the conventional APDU handler 500 or to a new APDU handler 511 can be performed in various ways. In a first embodiment, the module 510 contains a list of APDU that are to be forwarded to the conventional APDU handler 500 and/or a list of newly defined APDU that are to be directed to the new APDU. This list is preferably located also in the EEPROM and can thus be adapted. In another embodiment, the APDU handler 500 directs the received APDU to the new APDU handler 511 only if it receives an error message from the conventional APDU handler, namely if the conventional APDU handler cannot process this APDU. In another embodiment, the test module 510 can itself determine, on the basis of the CLA or INS bytes, to which APDU handler the received APDU 20 is to be forwarded. In yet another embodiment, newly defined APDU that are to be forwarded to the new APDU handler 511 are specially marked, for example by means of being misused, for example by containing special, impossible or very improbable parameters P1, P2 or data 201.

The new APDU handler 511 is preferably located in the EEPROM 51. In this manner, it can also be altered after the manufacture of the ROM 50, in order for example to ensure access to new components G1, G2, G3 that have meanwhile been implemented. Preferably, the test module 510 is also located in the EEPROM so that the test conditions can be set after the manufacture of the ROM and/or after the distribution of the chip cards. The test module 510 could however also be located in the ROM 50 or even in the RAM 52.

The new components G1, G2, G3, . . . can be contained in the ROM 50 or in the EEPROM 51. Further components temporarily stored in the RAM 52 can also be made available. If the chip card 5 can play the role of master of the interface 4 at least temporarily, it can with this mechanism access also components, for example applets, that are made available by the mobile equipment 3. It is even possible for the APDU handler 501 to access components that are located in an external device connected with the mobile equipment 3, for example over a contactless interface, for example an infrared, RFID or Bluetooth interface.

In a variant embodiment of the invention (not represented), the APDU handler 500 is modified in the ROM part 50 so that it automatically forwards all received APDU that are not known to a new adaptable APDU handler 511 in the EEPROM 51. This embodiment makes it possible to forgo the test module 510: that which cannot be processed by the conventional APDU handler 500 is automatically transmitted to the new APDU handler 511.

Figure 4:
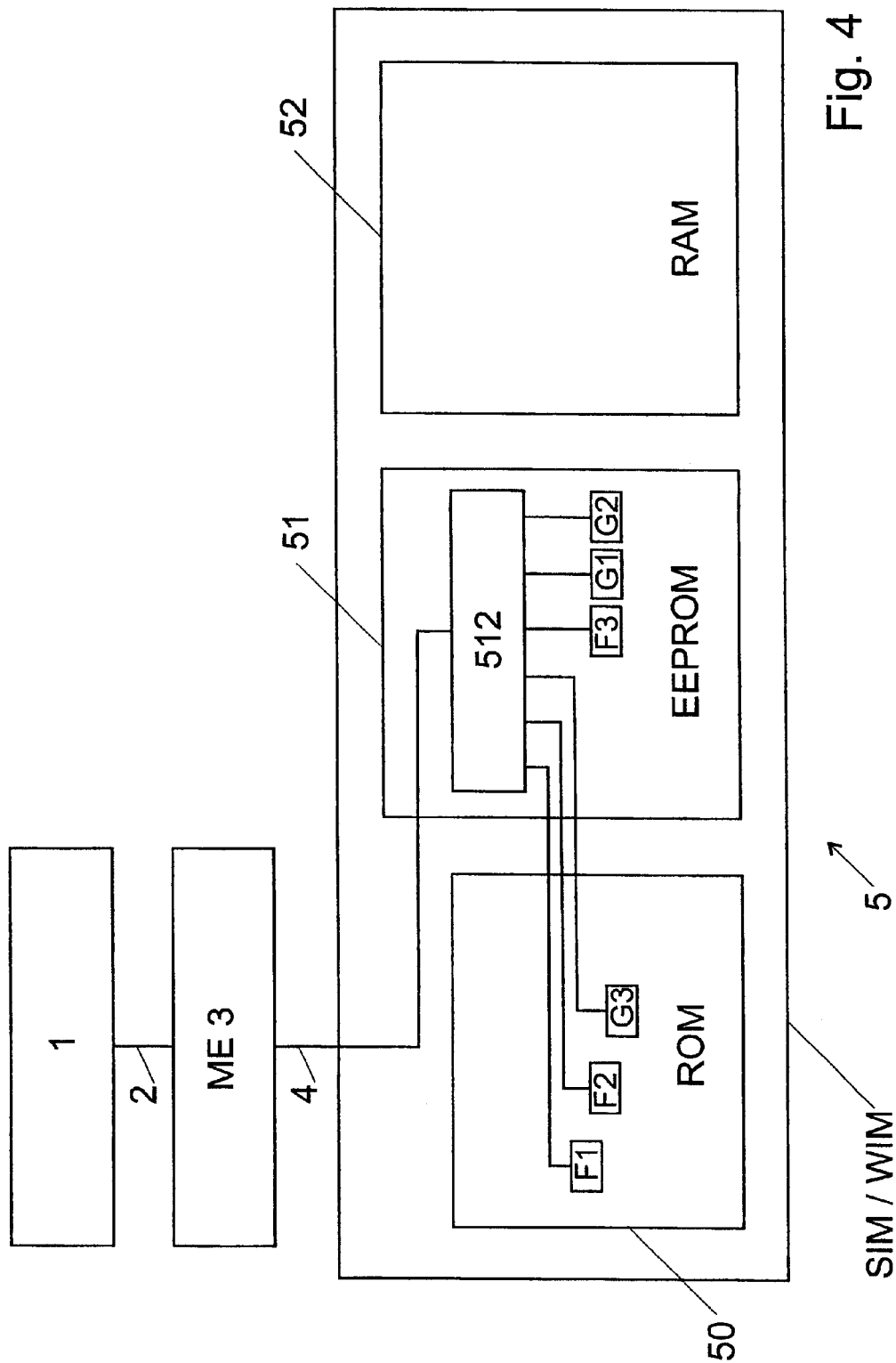
FIG. 4 shows a diagrammatic view of a system with a chip card according to a second embodiment of the invention.

FIG. 4 shows a further variant embodiment of a chip card according to the invention. The same or similar features are referred to in all figures with the same reference numbers and will not be described again unless this is necessary. In this embodiment, the normal APDU handler usually located in the ROM 50 has been replaced with a modified APDU handler 512 in the EEPROM. In this manner, it can be adapted at any time in order to take into account newly defined APDU.

This variant embodiment allows a great flexibility, since new components G1, G2, G3 and new APDU can be implemented at any time in the card 5.

In a variant embodiment (not represented) the modified APDU handler is also located in the RAM 52 so that it can easily be modified through the chip card's operating system or through the application 1.

In this manner, an application 1 can access functionalities of a chip card 5 that were not provided at the time of manufacture of the card and for which no APDU has been standardized, for example functionalities G1, G2, G3 . . . that were downloaded as applet over an air interface only after the personalization or even after the distribution of the card.

For example, the test module 510 and/or the new APDU handler 511 resp. 512 can be adapted with a message over a mobile radio network, for example with a SMS message, a USSD message a GPRS packet, an IP packet, etc. The test module 510 and/or the APDU handler can also be modified or completed by an application 1, for example a browser, that has been loaded for example over the air interface or with a data carrier.

In a variant embodiment of the invention, each APDU can trigger the execution of several different functions in the chip card 5. A special APDU defines in which state the card is and which set of functions is to be used in future. This variant allows for all functionalities of the chip card to be replaced by sending a single APDU, by means of incoming APDU being processed by a new APDU handler. In this manner, for example, all parameters and components stored in the EEPROM 51 can temporarily be replaced. Another special APDU can then return the chip card to its normal state.

What is claimed is:

1. A chip card capable of communicating over a logical interface by means of standardized data units, said chip card comprising:
   a standardized data unit handler for receiving said standardized data units;
   a first memory unit for storing said standardized data unit handler;
   a second memory unit that is programmable; and
   a test module capable of forwarding said standardized data units to said standardized data unit handler and also capable of forwarding said standardized data units to other components of said chip card, wherein
   said test module and/or said other components are stored at least partially in said second memory unit.

2. The chip card of the claim 1, wherein said test module is stored in the first memory unit.

3. The chip card of claim 1, wherein said test module is stored in the second memory unit.

4. The chip card of claim 1, wherein said test module determines, on the basis of a header of said standardized data units, whereto the data unit is to be forwarded.

5. The chip card of claim 4, said header comprising:
   a data unit class;
   an instruction that is to be executed; and
   at least two parameters for the instruction to be executed, wherein
   said test module determines, on the basis of said parameters, whereto the data unit is to be forwarded.

6. The chip card of claim 5, said at least two parameters having exactly two parameters.

7. The chip card of claim 1, further comprising an APDU handler stored in the second memory unit for forwarding said standardized data units to an appropriate component in said chip card.

8. The chip card of claim 1, further comprising an APDU handler stored in the first memory unit for forwarding said standardized data units to an appropriate component in said chip card.

9. The chip card of claim 1, further comprising:
   a RAM unit; and
   an APDU handler stored in the RAM unit for forwarding said standardized data units to an appropriate component in said chip card.

10. The chip card claim 1, further comprising:
    a second APDU handler, and
    an APDU handler for forwarding all standardized data units that are unknown to said second APDU handler.

11. The chip of claim 1, wherein said chip card is a SIM card.

12. The chip card of claim 1, wherein said chip card is a WIM card.

13. A chip card capable of communicating with an external device over a logical interface utilizing standardized data units, said standardized data units comprising a header including:
    one byte indicating the data class;
    one byte indicating the instruction that is to be executed; and
    at least two bytes corresponding to at least two parameters for the instruction to be executed; said chip card comprising:
    a ROM;
    an EEPROM; and
    a module stored at least partially in said EEPROM for determining, on the basis of said at least two parameters of said header, which component of said chip card is called up when a certain data unit is received over said logical interface.

14. The chip card according to claim 13, further comprising an APDU handler for forwarding said received data units to an appropriate component in said chip card.

15. The chip card of claim 14, wherein said APDU handler is stored in said EEPROM.

16. The chip of claim 14, wherein said APDU handler is stored in RAM.

17. The chip card claim 14, wherein said APDU handler is stored in said ROM.

18. The chip card according to claim 13, wherein said chip card is a SIM card.

19. The chip card of claim 13, wherein said chip card is a WIM card.

20. A method for adapting a chip card after its manufacture to a new standardization of the API interface, said method comprising the steps of:
    adapting said chip card to receive standardized data units comprising a header including:
    a data class;
    an instruction to be executed; and
    at least two parameters for the instruction to be executed;
    and
    adapting a module of the chip card to determine a functionality to be called up when a certain data unit is received over said API interface on the basis of said at least two parameters of said header.

21. The method of claim 20, wherein said module is adapted with a message received over a mobile radio network.

22. The method of claim 21, wherein said message is an SMS message.

23. The method of claim 21, wherein said message is a USSD message.

24. The method of claim 21, wherein said message is a GPRS packet.

25. The method of claim 21, wherein said message is an IP packet.

26. A chip card comprising:

a conventional APDU handler for receiving APDUs;

means for adding a new APDU handler to said chip card for receiving the same or different APDUs; an a test module for forwarding a received APDU to either said conventional APDU handler or to said new APDU handler based on one or more of: a list of new APDUs, an error message from said conventional APDU handler, and information included in said received APDU.

27. The chip card of claim 26, wherein said test module is for forwarding the receive APDU to either said conventional APDU handler or to said new APDU handler based on a list of new APDUs.

28. The chip card of claim 26, wherein said test module is for forwarding the receive APDU to said new APDU handler based on an error message from said conventional APDU handler.

29. The chip card of claim 26, wherein said test module is for forwarding the receive APDU to either said conventional APDU handler or to said new APDU handler based on information include in said received APDU.

* * * * *